United States Patent
Sugihira et al.

(10) Patent No.: US 10,190,519 B2
(45) Date of Patent: Jan. 29, 2019

(54) CONTROL DEVICE FOR INTERNAL COMBUSTION ENGINE

(71) Applicant: TOYOTA JIDOSHA KABUSHIKI KAISHA, Toyota-shi, Aichi-ken (JP)

(72) Inventors: Shigehiro Sugihira, Susono (JP); Naoto Kato, Gotenba (JP); Satoshi Yoshizaki, Gotenba (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 15/537,995

(22) PCT Filed: Oct. 27, 2015

(86) PCT No.: PCT/JP2015/005402
§ 371 (c)(1),
(2) Date: Jun. 20, 2017

(87) PCT Pub. No.: WO2016/103548
PCT Pub. Date: Jun. 30, 2016

(65) Prior Publication Data
US 2017/0350338 A1    Dec. 7, 2017

(30) Foreign Application Priority Data

Dec. 25, 2014    (JP) ................................ 2014-263055

(51) Int. Cl.
*F02D 41/14* (2006.01)
*F02D 41/10* (2006.01)
(Continued)

(52) U.S. Cl.
CPC .......... *F02D 41/1475* (2013.01); *F02B 37/18* (2013.01); *F02D 23/02* (2013.01);
(Continued)

(58) Field of Classification Search
CPC .. F02D 41/1475; F02D 41/0007; F02D 41/26; F02D 41/3064; F02D 41/307; F02D 2250/21; F02D 2200/1002; F02B 37/18
(Continued)

(56) References Cited

U.S. PATENT DOCUMENTS 4,873,961 A    10/1989   Tanaka
5,996,547 A    12/1999   Machida et al.
(Continued)

FOREIGN PATENT DOCUMENTS

DE    102007000088 A1    8/2007
JP    H08-177569 A       7/1996
(Continued)

OTHER PUBLICATIONS

Non-Final Office Action dated May 11, 2018; issued by the U.S. Patent and Trademark Office in U.S. Appl. No. 15/534,696; 36 pages.
USPTO, Final Office Action issued to U.S. Appl. No. 15/534,696 dated Sep. 24, 2018, 10 pages.

*Primary Examiner* — Hai Huynh
(74) *Attorney, Agent, or Firm* — Hunton Andrews Kurth LLP

(57) ABSTRACT

The invention relates to a control device for an internal combustion engine that includes a turbocharger, and an actuator that changes a turbocharging pressure by regulating exhaust energy for use in drive of the turbocharger. When a target torque is increased during execution of a lean burn operation, the control device switches an operation mode of the internal combustion engine from the lean burn operation to a stoichiometric operation. When the operation mode switching is performed in a turbocharging state, the control device determines whether a target torque is within a range of a torque realizable under the lean air-fuel ratio. When the target torque is within the range, the control device operates
(Continued)

the actuator so as to keep the turbocharging pressure at a magnitude equal to or larger than a magnitude at a time point at which the operation mode is switched.

8 Claims, 4 Drawing Sheets

(51) Int. Cl.
*F02B 37/18* (2006.01)
*F02D 23/02* (2006.01)
*F02D 41/00* (2006.01)
*F02D 41/30* (2006.01)

(52) U.S. Cl.
CPC ......... *F02D 41/0007* (2013.01); *F02D 41/10* (2013.01); *F02D 41/3094* (2013.01); *F02D 2200/1002* (2013.01); *F02D 2250/21* (2013.01); *Y02T 10/144* (2013.01)

(58) Field of Classification Search
USPC .................................. 123/443, 436; 701/110
See application file for complete search history.

(56) References Cited

U.S. PATENT DOCUMENTS

| 6,971,367 | B2* | 12/2005 | Satou ................... F02D 11/105 |
| | | | 123/350 |
| 2002/0107107 | A1 | 8/2002 | Ogawa et al. | |
| 2004/0134464 | A1 | 7/2004 | Mogi | |
| 2016/0363071 | A1* | 12/2016 | Matsumoto ........... F02B 37/183 |
| 2017/0342926 | A1 | 11/2017 | Sugihira et al. | |

FOREIGN PATENT DOCUMENTS

| JP | H11-22512 A | 1/1999 |
| JP | 2000-052817 A | 2/2000 |
| JP | 2000-213390 A | 8/2000 |
| JP | 2002-235579 A | 8/2002 |
| JP | 2004-169709 A | 6/2004 |
| JP | 2004-218432 A | 8/2004 |
| JP | 2005-155428 A | 6/2005 |
| JP | 2007-218143 A | 8/2007 |
| JP | 2014-163317 A | 9/2014 |

* cited by examiner

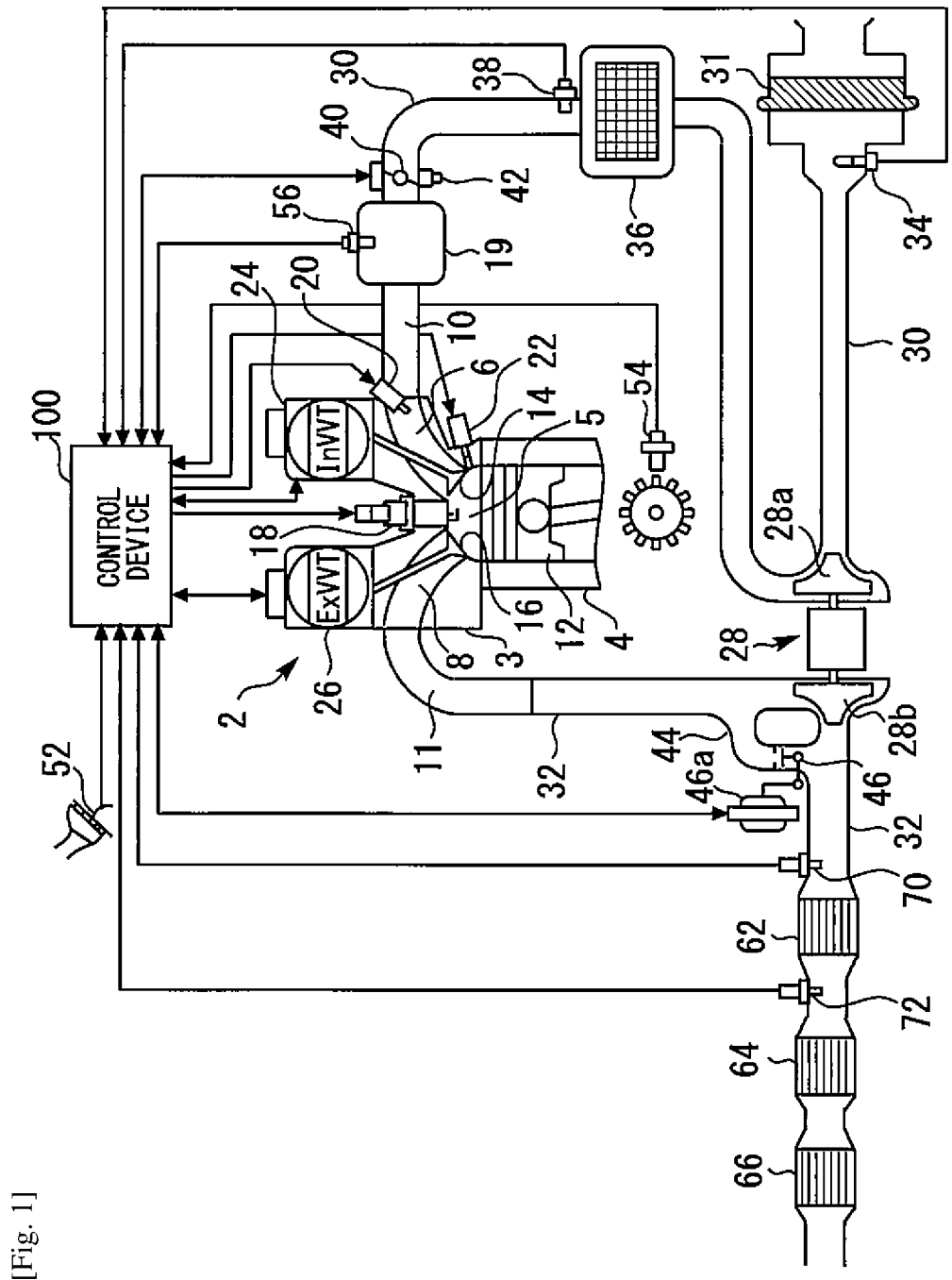
[Fig. 1]

[Fig. 2]
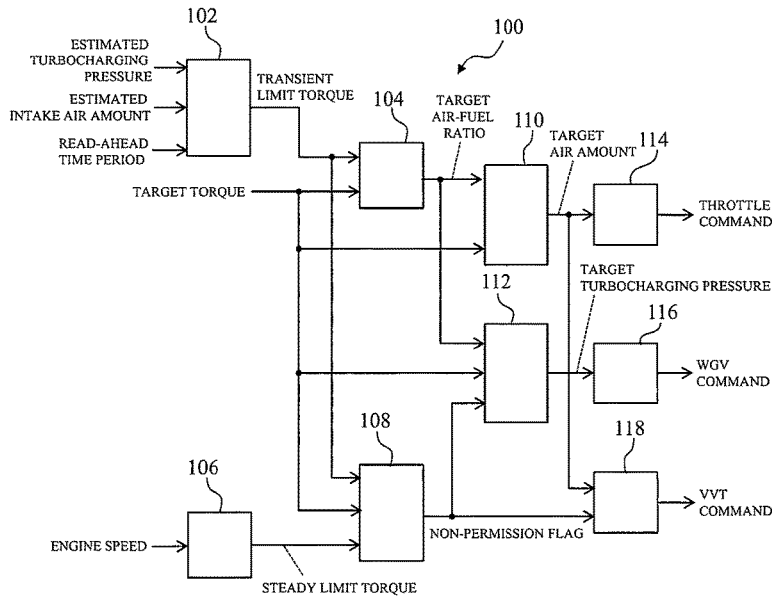
[Fig. 3]
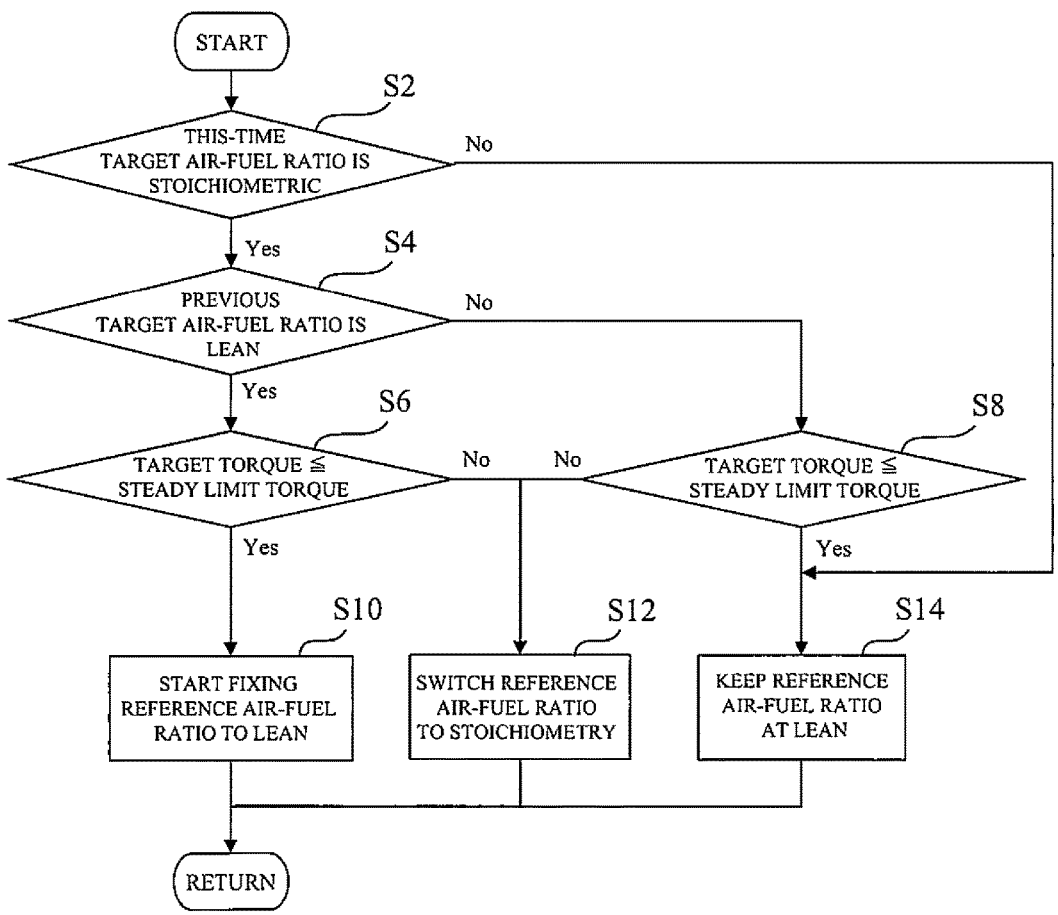

[Fig. 4]
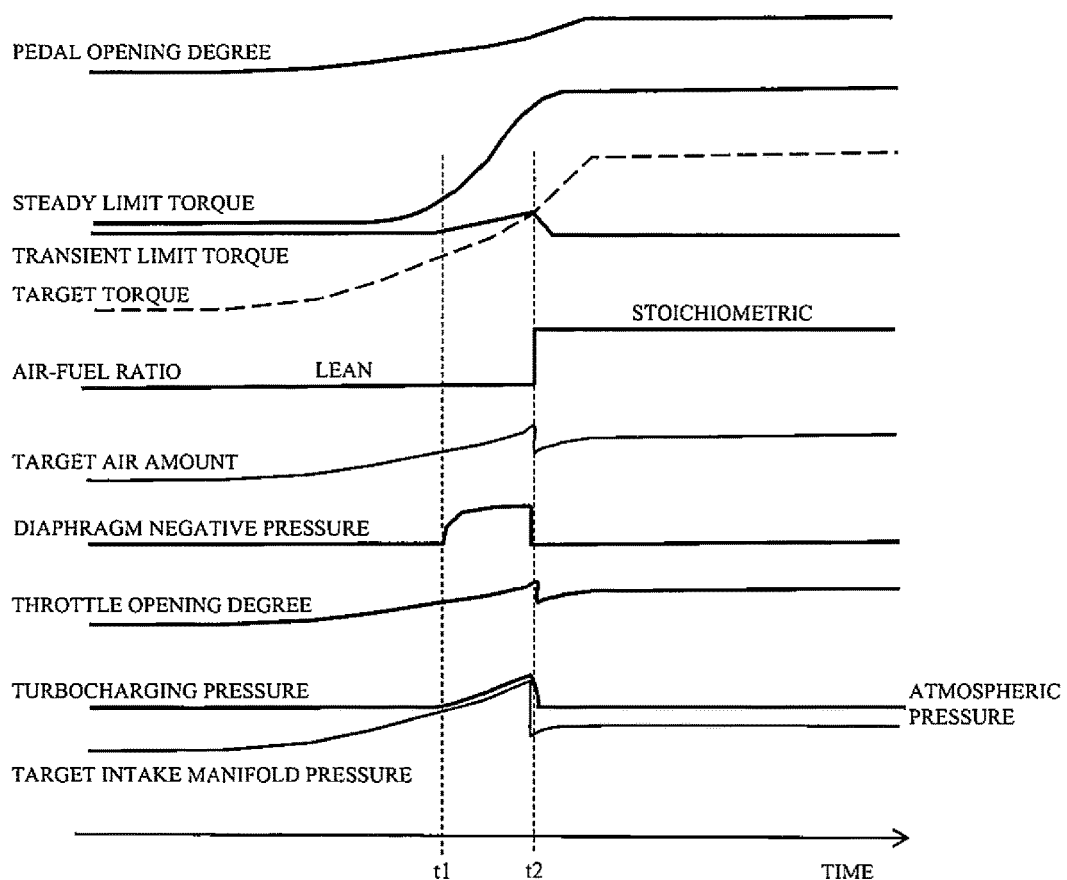

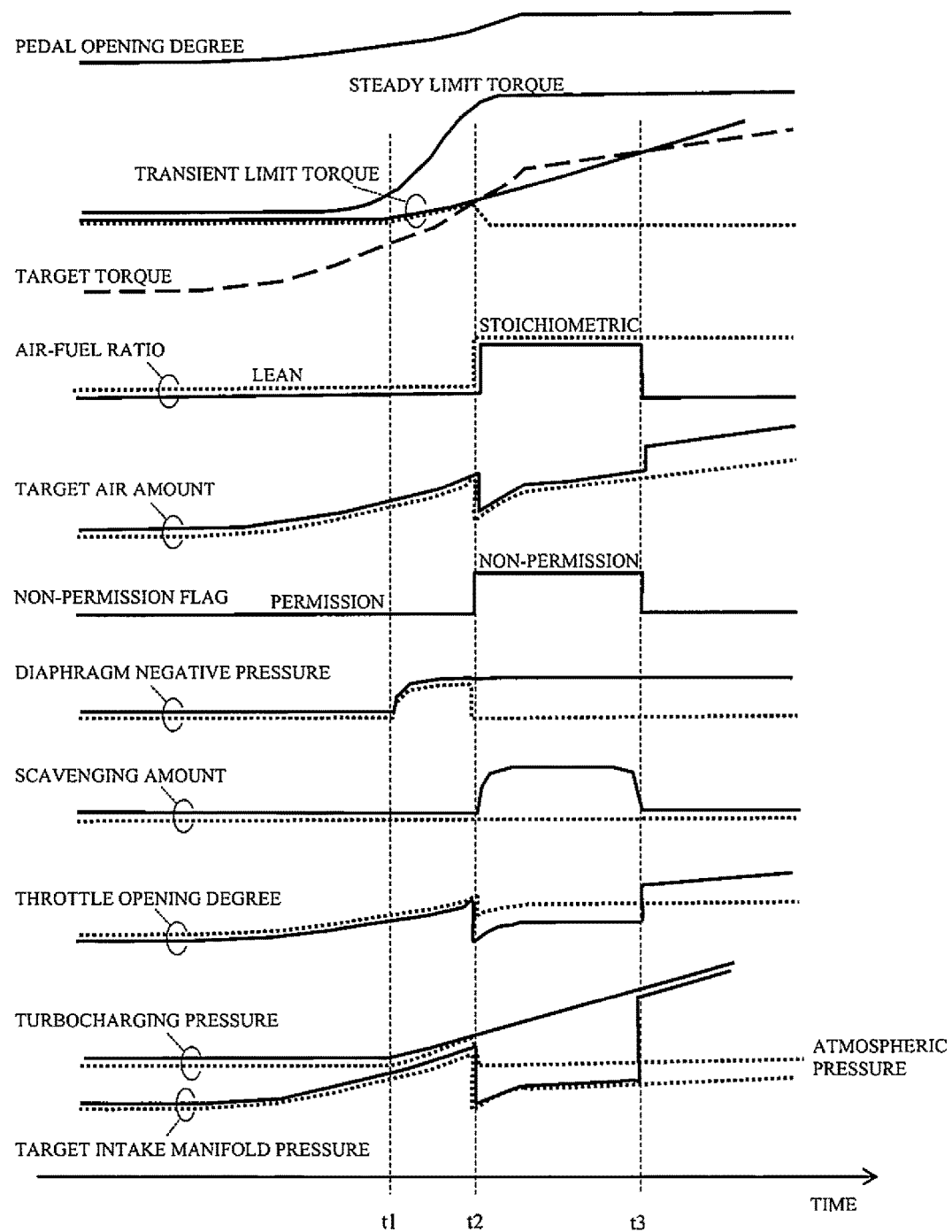
[Fig. 5]

CONTROL DEVICE FOR INTERNAL COMBUSTION ENGINE

CROSS-REFERENCE TO RELATED APPLICATIONS

This is a national phase application based on the PCT International Patent Application No. PCT/JP2015/005402 filed Oct. 27, 2015, claiming priority to Japanese Patent Application No. 2014-263055 filed Dec. 25, 2014, the entire contents of both of which are incorporated herein by reference.

FIELD

The present invention relates to a control device for an internal combustion engine, and more particular relates to a control device for an internal combustion engine that includes a turbocharger, and an actuator that changes a turbocharging pressure by regulating exhaust energy for use in drive of the turbocharger, and can select a stoichiometric operation by a theoretical air-fuel ratio, and a lean burn operation by a lean air-fuel ratio that is larger than the theoretical air-fuel ratio.

BACKGROUND

As is disclosed in JP2000-052817A, as a control method for an internal combustion engine capable of a lean burn operation, there is known a control method that compares the target torque that is calculated from an accelerator pedal opening degree or the like with a predetermined judgement value, selects a lean burn operation when the target torque is equal to or smaller than the judgement value, and selects a stoichiometric operation when the target torque is larger than the judgement value. Further, as is disclosed in JP11-022512A, there is also known a control method that switches the operation mode of an internal combustion engine from a lean burn operation to a stoichiometric operation when a difference that is equal to or larger than a predetermined value is generated between a target torque and an actual torque during a lean burn operation.

Further, there is also known a control method that quickly switches the operation mode of an internal combustion engine from a lean burn operation to a stoichiometric operation when an acceleration request by an operator is detected during the lean burn operation.

SUMMARY

Incidentally, in the internal combustion engine equipped with a turbocharger, the operation range where a lean burn operation is possible extends to the turbocharging region in which turbocharging by the turbocharger is performed. When the operation mode of the internal combustion engine is switched from a lean burn operation to a stoichiometric operation in the turbocharging region, the turbocharging pressure is reduced to reduce a pump loss, at the same time as the throttle is closed. The turbocharging pressure can be controlled by operation of the actuators that can regulate exhaust energy for use in drive of the turbocharger, such as a wastegate valve and a variable nozzle.

However, when the turbocharging pressure is temporarily reduced, the intake air amount cannot be increased immediately, even if the target torque enters the range where the target torque is realizable by a lean burn operation, after end of acceleration. As a result, a lot of time is taken to switch the operation from a stoichiometric operation to the lean burn operation, and an opportunity to enhance fuel efficiency by the lean burn operation is wasted.

The present invention is made in the light of the problem as described above, and has an object to provide a control device for an internal combustion engine capable of preparing a condition for switching to a lean burn operation again at an early stage, after switching from the lean burn operation to a stoichiometric operation in accordance with an acceleration request.

The present invention is applied to a control device for an internal combustion engine that includes a turbocharger, and an actuator that is configured to change a turbocharging pressure by regulating exhaust energy for use in drive of the turbocharger, and can select a stoichiometric operation and a lean burn operation. According to the present invention, the control device is configured as follows to achieve the above described object.

The control device is configured to include switching means for switching an operation mode of the internal combustion engine from a lean burn operation to a stoichiometric operation when a target torque increases during execution of the lean burn operation. Further, the control device is configured to include determination means for determining whether the target torque is within a range of a torque that is realizable under a lean air-fuel ratio, when the operation mode is switched from the lean burn operation to the stoichiometric operation by the switching means in a turbocharging state in which the turbocharging pressure is higher than an atmospheric pressure. Furthermore, the control device is configured to include operation means for operating the actuator to keep the turbocharging pressure at a magnitude that is equal to or larger than a magnitude at a time point at which the operation mode is switched from the lean burn operation to the stoichiometric operation by the switching means, when the determination means determines that the target torque is within the range of the torque that is realizable under the lean air-fuel ratio.

The operation means may be configured to keep a manipulated variable of the actuator at a value at the time point at which the operation mode is switched from the lean burn operation to the stoichiometric operation by the switching means, or change the manipulated variable of the actuator to a value to make the turbocharging pressure increase, when the determination means determines that the target torque is within the range of the torque that is realizable under the lean air-fuel ratio. Further, the operation means may be configured to operate the actuator to reduce the turbocharging pressure, when the determination means determines that the target torque exceeds the range of the torque that is realizable under the lean air-fuel ratio. Further, the determination means may be configured to calculate an upper limit value of the range of the torque that is realizable under the lean air-fuel ratio from an engine speed, and determine whether or not the target torque is equal to or smaller than the upper limit value.

According to the control device configured as above, when switch from the lean burn operation to the stoichiometric operation is performed in the turbocharging state, the turbocharging pressure is kept at a magnitude that is equal to or larger than the magnitude at that point of time, and therefore, the condition for switching to the lean burn operation again is prepared at an early stage.

BRIEF DESCRIPTION OF DRAWINGS

FIG. 1 is a diagram showing a configuration of an engine system of an embodiment of the present invention.

FIG. 2 is a block diagram showing a configuration of a control device of the embodiment of the present invention.

FIG. 3 is a flowchart showing a selection rule of a reference air-fuel ratio for use in calculation of a target turbocharging pressure in the embodiment of the present invention.

FIG. 4 is a time chart showing an operation of a comparative example relative to the control device of the embodiment of the present invention.

FIG. 5 is a time chart showing an operation that is realized by the control device of the embodiment of the present invention.

DESCRIPTION OF EMBODIMENT

Hereinafter, an embodiment of the present invention will be described with reference to the drawings. Note that when the numerals of the numbers, the quantities, the amounts, the ranges and the like of the respective elements are mentioned in the embodiment shown as follows, the present invention is not limited to the mentioned numerals unless specially explicitly described otherwise, or unless the invention is explicitly specified by the numerals theoretically. Further, structures, steps and the like that are described in the embodiment shown as follows are not always indispensable to the present invention unless specially explicitly shown otherwise, or unless the invention is explicitly specified by them theoretically.

1. Configuration of Engine System

FIG. 1 is a diagram showing a configuration of an engine system according to embodiment 1 of the present invention. The engine system of the present embodiment includes an internal combustion engine (hereinafter described as an engine) 2 equipped with a turbocharger, that is loaded on an automobile as a power plant. The engine 2 is a lean burn engine capable of selecting a stoichiometric operation (that is, an operation by a theoretical air-fuel ratio) and a lean burn operation (that is, an operation by a predetermined lean air-fuel ratio that is larger (leaner) than the theoretical air-fuel ratio). An air-fuel ratio at the lean burn operation is set at an air-fuel ratio range that is leaner than an air-fuel ratio range where a large amount of NOx is generated, for example, at an air-fuel ratio range of approximately 24.

The engine 2 includes a cylinder block 4 in which a piston 12 is disposed and a cylinder head 3. The number of cylinders and cylinder disposition of the engine 2 are not specially limited. A space sandwiched by the cylinder head 3 and the piston 12 is a combustion chamber 5. The engine 2 is a spark-ignition type engine, and an ignition plug 18 of an ignition device is mounted to the cylinder head 3 to protrude to a top portion of the combustion chamber 5.

An intake port 6 and an exhaust port 8 are respectively open to the combustion chamber 5. A communication state of the combustion chamber 5 and the intake port 6 is controlled by an intake valve 14 that is provided in the cylinder head 3. A communication state of the combustion chamber 5 and the exhaust port 8 is controlled by an exhaust valve 16 that is provided in the cylinder head 3. The intake valve 14 is provided with an intake variable valve device 24 that makes at least a valve timing variable. The exhaust valve 16 is provided with a exhaust variable valve device 26 that makes at least a valve timing variable. In the mechanisms which make the valve timings variable, known valve mechanisms that change phases of camshafts to crankshafts can be used.

The engine 2 includes two fuel injection valves in each cylinder. One is a cylinder injection valve 22 that directly injects fuel into the combustion chamber 5, and the other is a port injection valve 20 that injects fuel into the intake port 6.

An intake manifold 10 with which a surge tank 19 is integrated is connected to the intake port 6. An intake passage 30 that takes in fresh air from outside is connected to the surge tank 19. An electronically controlled throttle 40 is provided near the entrance to the surge tank 19 in the intake passage 30. An air cleaner 31 is provided at a tip end of the intake passage 30.

An exhaust manifold 11 is connected to the exhaust port 8. An exhaust passage 32 that vents an exhaust gas to outside is connected to the exhaust manifold 11. In the exhaust passage 32, a three-way catalyst 62, a NOx storage reduction catalyst 64 and a selective reduction catalyst 66 are provided in sequence from an upstream side of the exhaust passage 32.

The engine 2 has a turbocharger 28. A compressor 28a of the turbocharger 28 is provided upstream of the throttle 40 in the intake passage 30. An intercooler 36 that cools intake air that is compressed by the compressor 28a is provided between the compressor 28a and the throttle 40 in the intake passage 30. A turbine 28b of the turbocharger 28 is provided upstream of the three-way catalyst 62 in the exhaust passage 32. In a vicinity of the turbine 28b, a bypass passage 44 that connects an upstream side and a downstream side of the turbine 28b is provided. In the bypass passage 44, a wastegate valve 46 is installed. When the wastegate valve 46 is opened, part of the exhaust gas flows through the bypass passage 44 without passing through the turbine 28b. The wastegate valve 46 is driven by a diaphragm type negative pressure actuator 46a.

The system of the present embodiment includes sensors for obtaining information concerning an operation state of the engine 2 in various spots. An air flow meter 34 for measuring an intake air amount is installed directly downstream of the air cleaner 31 in the intake passage 30. A pressure sensor 38 for measuring a turbocharging pressure is installed directly downstream of the intercooler 36 in the intake passage 30. A throttle position sensor 42 for measuring an opening degree of the throttle 40 is installed in a vicinity of the throttle 40. In the surge tank 19, a pressure sensor 56 for measuring an intake manifold pressure is installed. In the present description, a pressure on an upstream side of the throttle 40 will be described as the turbocharging pressure, and a pressure on a downstream side of the throttle 40 will be described as the intake manifold pressure.

An air-fuel ratio sensor 70 that outputs a signal which linearly changes with respect to an air-fuel ratio of an exhaust gas before combustion is installed directly upstream of the three-way catalyst 62 in the exhaust passage 32. Further, an oxygen sensor 72 that outputs a signal which changes stepwise with a theoretical air-fuel ratio as a boundary is installed directly downstream of the three-way catalyst 62 in the exhaust passage 32.

Further, the system of the present embodiment has an accelerator position sensor 52 for measuring an opening degree of an accelerator pedal, and a crank angle sensor 54 for measuring a crank angle of the engine 2.

The aforementioned various sensors and actuators are electrically connected to a control device 100. The control device 100 is an ECU (Electronic Control Unit). The control device 100 performs control of the entire system of the engine 2, and is configured mainly by a computer including a CPU, a ROM, and a RAM. The ROM stores routines of various kinds of control. The routines are executed by the control device 100, whereby the actuators are operated based on the signals from the sensors so that the operation of the engine 2 is controlled.

2. Configuration of Control Device

FIG. 2 is a block diagram showing a configuration of the control device 100 of embodiment 1. The control device 100 includes a first arithmetic unit (transient limit torque calculating unit) 102, a second arithmetic unit (target air-fuel ratio setting unit) 104, a third arithmetic unit (steady limit torque calculating unit) 106, a fourth arithmetic unit (turbocharging pressure reduction determining unit) 108, a fifth arithmetic unit (target air amount calculating unit) 110, a sixth arithmetic unit (target turbocharging pressure calculating unit) 112, a seventh arithmetic unit (throttle opening degree calculating unit) 114, an eighth arithmetic unit (wastegate valve opening degree calculating unit) 116, and a ninth arithmetic unit (valve timing calculating unit) 118. These arithmetic units 102 through 118 which are included by the control device 100 correspond to control programs stored in the ROM of the control device 100 or parts of the control programs. The control program is read from the ROM and is executed in the CPU, whereby functions of these arithmetic units 102 through 118 are realized in the control device 100.

A function of the first arithmetic unit 102 will be described. The first arithmetic unit 102 is configured to calculate a transient limit torque, which is an upper limit value of a torque that can be realized after a fixed time period from a present time point by a lean burn operation. In more detail, the transient limit torque is a torque that will be realized after the fixed time period from the present time point under the lean air-fuel ratio, if air amount controlling actuators are operated to increase an intake air amount in the cylinder at a maximum speed. The air amount controlling actuators mentioned here more specifically refer to the throttle 40, the wastegate valve 46, the intake variable valve device 24, and the exhaust variable valve device 26. When the throttle 40 is fully opened, and the wastegate valve 46 is fully closed, an increasing speed of the intake air amount becomes maximum, and an intake air amount that is realized after the fixed time period from the present time point also becomes maximum. Further, when making the intake air amount in the cylinder increase at the maximum speed, the intake variable valve device 24 and the exhaust variable valve device 26 regulate respective valve timings of the intake valve 14 and the exhaust valve 16 so that a flow rate of air that passes through the intake valve 14 becomes maximum. The flow rate of the air that passes through the intake valve 14 is made maximum, whereby a charge efficiency is enhanced, and the turbocharging pressure is also ready to increase by increase of the turbine flow rate.

The maximum intake air amount that is realized by operation of the air amount controlling actuators is uniquely determined by the intake air amount and the turbocharging pressure at the present time point, and a time period from the present time point to a prediction time point of the maximum intake air amount (this is described as a read-ahead time period). If a target air-fuel ratio at the lean burn operation is fixed, a torque is also determined in accordance with the intake air amount. Consequently, if the intake air amount and the turbocharging pressure at the present time point and the read-ahead time period are determined, the transient limit torque that is realizable after the fixed time period from the present time point (this is equal to the read-ahead time period) is also uniquely determined. The first arithmetic unit 102 searches a map stored in the ROM of the control device 100, and obtains the transient limit torque from an estimated intake air amount, an estimated turbocharging pressure and the read-ahead time period. The estimated intake air amount for use in search in the map is an estimated value of a present intake air amount, and is calculated from measured values of state quantities relating to the intake air amounts such as an intake manifold pressure and a cylinder pressure. The estimated turbocharging pressure for use in search in the map is an estimated value of a present turbocharging pressure that is calculated from measured values of the related state quantities. However, an actual value that is measured by the pressure sensor may be used in place of the estimated turbocharging pressure.

A function of the second arithmetic unit 104 will be described. The second arithmetic unit 104 is configured to select either one of the theoretical air-fuel ratio or a predetermined lean air-fuel ratio, and to set the target air-fuel ratio at the selected air-fuel ratio. Selection of the target air-fuel ratio is performed in accordance with comparison of the transient limit torque that is calculated in the first arithmetic unit 102 and a target torque. The target torque is determined from the accelerator pedal opening degree and an engine speed, by referring to a torque map that is stored in the ROM of the control device 100. Because the transient limit torque is the maximum torque that is realizable within the fixed time period under the lean air-fuel ratio, when the target torque is equal to or smaller than the transient limit torque, the target torque can be realized under the lean air-fuel ratio after the fixed time period elapses at the longest, even if a difference occurs between the target torque and an actual torque due to increase of the target torque. However, when the target torque is larger than the transient limit torque, the target torque cannot be realized under the lean air-fuel ratio even if the fixed time period elapses. A setting rule of the target air-fuel ratio in the second arithmetic unit 104 is determined based on such a relation between the target torque and the transient limit torque. That is to say, when the target torque is equal to or smaller than the transient limit torque, the second arithmetic unit 104 sets the target air-fuel ratio at the lean air-fuel ratio. When the target torque is larger than the transient limit torque, the second arithmetic unit 104 sets the target air-fuel ratio at the theoretical air-fuel ratio.

A function of the third arithmetic unit 106 will be described. The third arithmetic unit 106 is configured to calculate a steady limit torque, which is an upper limit value of a torque that is realizable in a steady state by the lean burn operation. In more detail, the steady limit torque is a torque under the lean air-fuel ratio, which is realized finally after a response delay of the intake air amount with respect to operation of the actuators, if the air amount controlling actuators are operated so that the intake air amount in the cylinder becomes maximum. A maximum intake air amount that is finally realized by the operation of the air amount controlling actuators, that is, the maximum intake air amount in a steady state is determined uniquely by the engine speed. Therefore, if the engine speed is determined, the steady limit torque which is realizable in the steady state is also determined uniquely. The third arithmetic unit 106 searches a map that is stored in the ROM of the control device 100, and obtains the steady limit torque from the engine speed. In the map, the steady limit torque is set so as to increase in accordance with increase in the engine speed.

A function of the fourth arithmetic unit 108 will be described. The fourth arithmetic unit 108 is configured to determine whether to permit the turbocharging pressure to be reduced when the operation is switched from the lean burn operation to the stoichiometric operation. When the target torques are the same, an air amount which is required in the stoichiometric operation is smaller than an air amount which is required in the lean burn operation. Therefore, when the lean burn operation is performed in the turbocharging state in which the turbocharging pressure is higher than the atmospheric pressure, the turbocharging pressure can be reduced when the operation is switched to the stoichiometric operation. It is possible to perform the stoichiometric operation while keeping the turbocharging pressure as a matter of course, but in order to enhance fuel efficiency by reducing a pump loss, it is desirable to open the wastegate valve 46 to reduce the turbocharging pressure.

However, there is a case in which it is more preferable not to reduce the turbocharging pressure from the viewpoint of long-term fuel efficiency. That is a case in which after the operation is switched to the stoichiometric operation, return to the lean burn operation is possible. When the target torque is equal to or smaller than the steady limit torque which is calculated in the third arithmetic unit 106, if the turbocharging pressure increases, the target torque can be realized under the lean air-fuel ratio in due course. However, if the wastegate valve 46 is opened, and the turbocharging pressure is temporarily reduced, a lot of time is required until the turbocharging pressure increases again and an air amount necessary for the lean burn operation is obtained. When the turbocharging pressure is not reduced in the stoichiometric operation, the pump loss is increased in a short period, but if the timing for switching to the lean burn operation can be made earlier thereby, a larger effect of enhancing fuel efficiency can be obtained.

The fourth arithmetic unit 108 determines whether to permit the turbocharging pressure to be reduced, based on a large/small relation between the target torque, the steady limit torque which is calculated in the third arithmetic unit 106, and the transient limit torque which is calculated in the first arithmetic unit 102. More specifically, in a case where the target torque exceeds the transient limit torque, and the target torque is equal to or smaller than the steady limit torque, the turbocharging pressure is not permitted to be reduced, and in the other cases, the turbocharging pressure is permitted to be reduced. According to the determination as above, while the stoichiometric operation is performed in a situation where shift to the lean burn operation is possible, the turbocharging pressure is not permitted to be reduced. When not permitting the turbocharging pressure to be reduced, the fourth arithmetic unit 108 sets a non-permission flag to ON.

A function of the fifth arithmetic unit 110 will be described. The fifth arithmetic unit 110 is configured to calculate a target air amount. The fifth arithmetic unit 110 refers to a torque-air amount conversion map that is stored in the ROM in the control device 100, and calculates the target air amount from the target torque. In the torque-air amount conversion map, torque and an air amount for realizing the torque are related with each other, with the air-fuel ratio and the engine speed as reference parameters. To the air-fuel ratio which is the reference parameter, the target air-fuel ratio which is set in the second arithmetic unit 104 is inputted. The target air amount which is calculated in the fifth arithmetic unit 110 is an air amount that is necessary to realize the target torque when the air-fuel ratio is adjusted to the target air-fuel ratio.

A function of the sixth arithmetic unit 112 will be described. The sixth arithmetic unit 112 is configured to calculate a target turbocharging pressure from the target torque, by using the torque-air amount conversion map for converting the target torque into the target air amount, and an air amount-turbocharging pressure conversion map for converting the target air amount into the target turbocharging pressure. The torque-air amount conversion map is the same as the map which is used by the fifth arithmetic unit 110, and the torque and the air amount for realizing the torque are related with each other with the air-fuel ratio and the engine speed as the reference parameters. In the air amount-turbocharging pressure conversion map, the air amount and a turbocharging pressure for realizing the air amount are related with each other. As the air-fuel ratio (hereinafter described as a reference air-fuel ratio) which is the reference parameter, either one of the lean air-fuel ratio or the theoretical air-fuel ratio is selected. When the lean air-fuel ratio is selected as the reference air-fuel ratio, the target turbocharging pressure which is calculated in the sixth arithmetic unit 112 becomes the turbocharging pressure which is necessary to realize the target torque when the air-fuel ratio is adjusted to the lean air-fuel ratio, and therefore, becomes larger than the target turbocharging pressure in a case of the theoretical air-fuel ratio being selected as the reference air-fuel ratio.

FIG. 3 is a flowchart showing a selection rule of the reference air-fuel ratio for use in search in the torque-air amount conversion map in the sixth arithmetic unit 112. The sixth arithmetic unit 112 performs selection of the reference air-fuel ratio in accordance with a procedure shown in the flowchart at each control period. First of all, in step S2, it is determined whether the target air-fuel ratio in the control period of this time is the theoretical air-fuel ratio (stoichiometry). When the target air-fuel ratio of this time is a lean air-fuel ratio, a processing in step S14 is selected. In step S14, keeping the reference air-fuel ratio at the lean air-fuel ratio is selected.

When the target air-fuel ratio of this time is the theoretical air-fuel ratio, determination in step S4 is performed. In step S4, it is determined whether a target air-fuel ratio in a control period of a previous time is the lean air-fuel ratio. When the target air-fuel ratio of the previous time is the lean air-fuel ratio, that is, when this time, the operation is switched from the lean burn operation to the stoichiometric operation, determination in step S6 is performed. When the target air-fuel ratio of the previous time is not the lean air-fuel ratio, that is, when the stoichiometric operation is performed so far, determination in step S8 is performed.

In step S6, it is determined whether the target torque is equal to or smaller than the steady limit torque, with reference to the determination by the fourth arithmetic unit 108. When the non-permission flag is set to ON, the target torque is equal to or smaller than the steady limit torque, and the target torque is within a range of a torque that is realizable under the lean air-fuel ratio. In this case, a processing in step S10 is selected. In step S10, fixing the reference air-fuel ratio to the lean air-fuel ratio is started. By selection of the processing, the target turbocharging pressure is prevented from being reduced in accordance with switching to the stoichiometric operation from the lean burn operation.

When the non-permission flag is set to OFF, the target torque is larger than the steady limit torque, and the target torque can never be realized under the lean air-fuel ratio. In this case, the processing in step S12 is selected. In step S12, changing the reference air-fuel ratio to the theoretical air-fuel ratio is selected. By selection of the processing, the target turbocharging pressure is reduced in accordance with switching from the lean burn operation to the stoichiometric operation, and fuel efficiency is prevented from being worsened by increase of a pump loss.

In step S8, it is determined whether or not the target torque is equal to or smaller than the steady limit torque, with reference to the determination in the fourth arithmetic unit 108. When the target torque is equal to or smaller than the steady limit torque, that is, when the non-permission flag is set to ON, the processing in step S14 is selected. In step S14, the reference air-fuel ratio is kept at the lean air-fuel ratio. By selection of the processing, the stoichiometric operation is continued without reducing the target turbocharging pressure.

When the target torque is larger than the steady limit torque, that is, when the non-permission flag is set to OFF, the processing in step S12 is selected. In step S12, changing the reference air-fuel ratio to the theoretical air-fuel ratio is selected. By selection of the processing, the target turbocharging pressure is reduced to an original value halfway through the stoichiometric operation, and worsening of the fuel efficiency due to increase of the pump loss is prevented from continuing.

Returning to FIG. 2 again, a function of the seventh arithmetic unit 114 will be subsequently described. The throttle opening degree calculating unit 114 is configured to calculate a throttle opening degree from the target air amount which is calculated in the fifth arithmetic unit 110. In more detail, a map stored in the ROM is referred to first, and a target intake manifold pressure is calculated from the target air amount. In the map, the air amount and the intake manifold pressure for realizing the air amount are related with each other, with the engine speed as the reference parameter. Next, the throttle opening degree for realizing the target intake manifold pressure is calculated by using a physical model that is obtained by modeling a relation between an operation of the throttle 40 and the intake manifold pressure. The seventh arithmetic unit 114 outputs the calculated throttle opening degree to the throttle 40 as a command value (a throttle command value).

A function of the eighth arithmetic unit 116 will be described. The eighth arithmetic unit 116 is configured to calculate a wastegate valve opening degree from the target turbocharging pressure that is calculated in the sixth arithmetic unit 112. The wastegate valve opening degree and the target turbocharging pressure are related with each other in a map stored in the ROM. When the target turbocharging pressure is equal to or smaller than the atmospheric pressure, the wastegate valve opening degree is fixed to full opening, and when the target turbocharging pressure is increased to be larger than the atmospheric pressure, the wastegate valve 46 is closed in response to the increase in the target turbocharging pressure. However, when there arises a request to increase the turbocharging pressure fast, the wastegate valve opening degree is set at full closure. The eighth arithmetic unit 116 determines a diaphragm negative pressure of the actuator 46a with the wastegate valve opening degree as an index, and outputs the diaphragm negative pressure to the actuator 46a as a command value (a WGV command value).

Lastly, a function of the ninth arithmetic unit 118 will be described. The ninth arithmetic unit 118 is configured to calculate respective valve timings of the intake valve 14 and the exhaust valve 16 from the target air amount which is calculated in the fifth arithmetic unit 110 with reference to a map which is stored in the ROM. In the map, adaptation values of the respective valve timings that can satisfy various requests concerning exhaust gas performance, fuel efficiency performance, stability of combustion and the like are related with the air amount, with the engine speed as the reference parameter. However, when the non-permission flag which is presented by the fourth arithmetic unit 108 is set to ON, the ninth arithmetic unit 118 calculates the valve timings that can increase a scavenging amount. The scavenging amount is an amount of a gas that blows through from the intake port 6 to the exhaust port 8 (an amount per one cycle, or a flow rate per unit time period), and is dependent on a valve overlap time period of the intake valve 14 and the exhaust valve 16. By increasing the scavenging amount, a turbine flow rate is increased and the turbocharging pressure is easily increased. The ninth arithmetic unit 118 outputs the calculated valve timings to the intake variable valve device 24 and the exhaust variable valve device 26 as command values (VVT command values).

3. Operation Realized by Control Device

Next, an operation that is realized by the control device 100 will be described by using a time chart with a comparative example thereof. The comparative example adopts a method that reduces the target air amount and, at the same time, reduces the turbocharging pressure, when switch from the lean burn operation to the stoichiometric operation is performed.

3-1. Operation of Comparative Example

FIG. 4 is a time chart showing an operation of the comparative example with respect to the control device 100. The time chart shown in FIG. 4 shows respective changes over time of the accelerator pedal opening degree, the steady limit torque, the transient limit torque, the target torque, the air-fuel ratio (the target air-fuel ratio), the target air amount, the diaphragm negative pressure of the wastegate valve 46, the throttle opening degree, the turbocharging pressure and the target intake manifold pressure, in a case of shifting to steady running from accelerating running by the lean burn operation.

As shown in the time chart, at the time of acceleration, the target torque monotonously increases in accordance with the accelerator pedal opening degree, and the target intake manifold pressure also monotonously increases in accordance with the target torque. The throttle opening degree is increased in accordance with the target intake manifold pressure. Until the target intake manifold pressure reaches the atmospheric pressure, the diaphragm negative pressure that determines the opening degree of the wastegate valve 46 is fixed to a minimum value.

When the target intake manifold pressure reaches the atmospheric pressure, and an operation range of the engine 2 enters a turbocharging range in due course (a time point t1), the diaphragm negative pressure is increased so as to close the wastegate valve 46. Thereby, the turbocharging pressure is increasing, but the exhaust energy which is obtained by the lean burn operation is not large. Therefore, an increasing speed of the turbocharging pressure does not increase, and an increasing speed of the transient limit torque that is calculated based on the turbocharging pressure is also suppressed to be low. When the increasing speed of the target torque is larger than the increasing speed of the transient limit torque, the target torque becomes larger than the transient limit torque in due course.

When the target torque becomes larger than the transient limit torque (a time point t2), the operation mode of the engine 2 is switched from the lean burn operation to the stoichiometric operation. At this time, the target air-fuel ratio is switched from the lean air-fuel ratio to the theoretical air-fuel ratio, and at the same time, the wastegate valve 46 is opened so that the turbocharging pressure is reduced to the atmospheric pressure. Further, the opening degree of the throttle 40 is also temporarily made small. After the intake air amount is temporarily reduced abruptly by these operations, the opening degree of the throttle 40 is increased in accordance with the target intake manifold pressure, and thereby the intake air amount is increased.

In the time chart, the accelerator pedal opening degree is made constant thereafter, whereby the target torque is also kept constant. At this time, the steady limit torque increases to be larger than the value at the lean burn operation as a result that the engine speed is increased by acceleration. This means that if the turbocharging pressure increases again and the transient limit torque becomes larger than the target torque, return to the lean burn operation is possible.

However, in the comparative example, after switching to the stoichiometric operation, the target torque is kept constant, as a result, the turbocharging pressure which is temporarily reduced to the atmospheric pressure does not increase again. Therefore, the transient limit torque does not become larger than the target torque, and the operation can never return to the lean burn operation. That is to say, with the method in the comparative example, an opportunity to enhance fuel efficiency by the lean burn operation is wasted.

3-2. Operation Realized by Control Device

FIG. 5 is a time chart showing an operation that is realized by the control device 100. The time chart shown in FIG. 5 shows respective changes over time of the accelerator pedal opening degree, the steady limit torque, the transient limit torque, the target torque, the air-fuel ratio (the target air-fuel ratio), the target air amount, the non-permission flag, the diaphragm negative pressure of the wastegate valve 46, the scavenging amount, the throttle opening degree, the turbocharging pressure and the target intake manifold pressure, in a case of shifting to the steady running from the accelerating running by the lean burn operation. Note that operations drawn by the solid lines in the time chart are the operations that are realized by the control device 100, and operations drawn by the dotted lines are the operations in the aforementioned comparative example.

As shown in the time chart, the operations until the time point t2 at which the target torque exceeds the transient limit torque are the same as the operations in the comparative example. A difference from the operations in the comparative example is the operations after the target torque exceeds the transient limit torque. According to the control device 100, when the target torque exceeds the transient limit torque, the target air-fuel ratio is switched from the lean air-fuel ratio to the theoretical air-fuel ratio. At the same time, the opening degree of the throttle 40 is temporarily made small, but the non-permission flag is set to ON, whereby the diaphragm negative pressure of the wastegate valve 46 is kept. Further, in response to the setting of the non-permission flag to ON, the respective valve timings of the intake valve 14 and the exhaust valve 16 are changed to increase the scavenging amount.

By keeping the diaphragm negative pressure, the turbocharging pressure is kept at a magnitude that is equal to or larger than at least a magnitude at the time point at which the target air-fuel ratio is switched to the lean air-fuel ratio. Furthermore, by increasing the scavenging amount, the turbine work is increased and the turbocharging pressure is further increased. When the turbocharging pressure is increased, the transient limit torque which is calculated based on the turbocharging pressure increases in accordance with the increase of the turbocharging pressure, and exceeds the stagnating target torque in due course (a time point t3). Thereby, the non-permission flag is switched from ON to OFF again. While the non-permission flag is set to ON, the throttle opening degree is made smaller than the throttle opening degree in the comparative example. This is because the turbocharging pressure is kept at a value higher than the atmospheric pressure. Reducing the throttle opening degree is contrary to enhancement in the fuel efficiency in a short period, but can enhance the fuel efficiency in a long period because switching to the lean burn operation is advanced.

When the transient limit torque becomes equal to or larger than the target torque, the control device 100 switches the target air-fuel ratio from the theoretical air-fuel ratio to the lean air-fuel ratio again. At the same time, the control device 100 increases the opening degree of the throttle 40 to full opening or an opening degree close to the full opening while keeping the diaphragm negative pressure of the wastegate valve 46. The respective valve timings of the intake valve 14 and the exhaust valve 16 are changed to adaptation values suitable for the target air amount. Thereby, the operation mode of the engine 2 is switched from the stoichiometric operation to the lean burn operation, and enhancement of the fuel efficiency can be expected.

4. Others

In the aforementioned embodiment, the functions which the transient limit torque calculating unit 102 and the second arithmetic unit 104 have correspond to a function of "switching means" according to the present invention. Further, functions which the third arithmetic unit 106 and the fourth arithmetic unit 108 have correspond to a function of "determination means" according to the present invention. The functions that the sixth arithmetic unit 112 and the eighth arithmetic unit 116 have correspond to a function of "operation means" according to the present invention.

In the aforementioned embodiment, the diaphragm negative pressure is kept at a fixed value, while the non-permission flag is set to ON, but the diaphragm negative pressure may be changed so that the turbocharging pressure is increased by making the opening degree of the wastegate valve small. In the aforementioned embodiment, the wastegate valve is provided as the actuator that changes the turbocharging pressure by regulating the exhaust energy for use in drive of the turbocharger, but a variable nozzle can be used instead.

REFERENCE SIGNS LIST

2 Engine
5 Combustion chamber
14 Intake valve
16 Exhaust valve
20 Port injection valve
22 Cylinder injection valve
24 Intake variable valve device
26 Exhaust variable valve device
28 Turbocharger
28a Compressor
28b Turbine
30 Intake passage
32 Exhaust passage 40 Throttle
46 Wastegate valve
46a Diaphragm type negative pressure actuator
100 Control device
102 First arithmetic unit (transient limit torque calculating unit)
104 Second arithmetic unit (target air-fuel ratio setting unit)
106 Third arithmetic unit (steady limit torque calculating unit)
108 Fourth arithmetic unit (turbocharging pressure reduction determining unit)
110 Fifth arithmetic unit (target air amount calculating unit)
112 Sixth arithmetic unit (target turbocharging pressure calculating unit)
114 Seventh arithmetic unit (throttle opening degree calculating unit)
116 Eighth arithmetic unit (wastegate valve opening degree calculating unit)
118 Ninth arithmetic unit (valve timing calculating unit)

The invention claimed is:

1. A control device for an internal combustion engine that includes a turbocharger, and an actuator that is configured to change a turbocharging pressure by regulating exhaust energy for use in drive of the turbocharger, and can select a stoichiometric operation by a theoretical air-fuel ratio, and a lean burn operation by a lean air-fuel ratio that is larger than the theoretical air-fuel ratio, comprising:
at least one processor; and
at least one memory including at least one computer program, the at least one memory and the at least one computer program configured, with the at least one processor, to cause the control device at least to operate as:
switching means for switching an operation mode of the internal combustion engine from the lean burn operation to the stoichiometric operation when a target torque increases during execution of the lean burn operation;
determination means for determining whether the increased target torque is within a range of a torque that is realizable under the lean air-fuel ratio, when operation mode switching is performed by the switching means in a turbocharging state in which the turbocharging pressure is higher than an atmospheric pressure; and
operation means for operating the actuator to keep the turbocharging pressure at a magnitude that is equal to or larger than a magnitude at a time point at which the operation mode is switched by the switching means, until the operation mode is switched to the lean burn operation again after the operation mode switching is performed, when the determination means determines that the increased target torque is within the range.

2. The control device for an internal combustion engine according to claim 1,
wherein the operation means keeps a manipulated variable of the actuator at a value at the time point at which the operation mode is switched by the switching means, or changes the manipulated variable of the actuator to a value to make the turbocharging pressure increase, when the determination means determines that the target torque is within the range.

3. The control device for an internal combustion engine according to claim 1,
wherein the operation means operates the actuator to reduce the turbocharging pressure, when the determination means determines that the target torque exceeds the range.

4. The control device for an internal combustion engine according to claim 1,
wherein the determination means calculates an upper limit value of the range from an engine speed, and determines whether or not the target torque is equal to or smaller than the upper limit value.

5. The control device for an internal combustion engine according to claim 1,
wherein the control device is further configured to keep a manipulated variable of the actuator at a value at the time point at which the operation mode is switched, or change the manipulated variable of the actuator to a value to make the turbocharging pressure increase, when the target torque is determined to be within the range.

6. The control device for an internal combustion engine according to claim 1,
wherein the control device is further configured to operate the actuator to reduce the turbocharging pressure, when the target torque is determined to exceed the range.

7. The control device for an internal combustion engine according to claim 1,
wherein the control device is further configured to calculate an upper limit value of the range from an engine speed, and determines whether or not the target torque is equal to or smaller than the upper limit value.

8. A control device for an internal combustion engine that includes a turbocharger, and an actuator that is configured to change a turbocharging pressure by regulating exhaust energy for use in drive of the turbocharger, and can select a stoichiometric operation by a theoretical air-fuel ratio, and a lean burn operation by a lean air-fuel ratio that is larger than the theoretical air-fuel ratio, comprising:
at least one processor; and
at least one memory including at least one computer program,
wherein the control device is configured to:
switch an operation mode of the internal combustion engine from the lean burn operation to the stoichiometric operation when a target torque increases during execution of the lean burn operation;
determine whether the target torque is within a range of a torque that is realizable under the lean air-fuel ratio, in response to operation mode switching being performed in a turbocharging state in which the turbocharging pressure is higher than an atmospheric pressure; and
operate the actuator to keep the turbocharging pressure at a magnitude that is equal to or larger than a magnitude at a time point at which the operation mode is switched, until the operation mode is switched to the lean burn operation again after the operation mode switching is performed, when the target torque is determined to be within the range.

* * * * *